(12) United States Patent
Schoonen

(10) Patent No.: US 10,746,442 B2
(45) Date of Patent: Aug. 18, 2020

(54) REFRIGERATING APPARATUS

(71) Applicant: Franke Technology and Trademark Ltd, Hergiswil (CH)

(72) Inventor: Wilhelmus Franciscus Schoonen, BA Son (NL)

(73) Assignee: Franke Technology and Trademark Ltd, Hergiswil (CH)

( * ) Notice: Subject to any disclaimer, the term of this patent is extended or adjusted under 35 U.S.C. 154(b) by 114 days.

(21) Appl. No.: 16/074,582

(22) PCT Filed: Feb. 4, 2016

(86) PCT No.: PCT/EP2016/052373
§ 371 (c)(1),
(2) Date: Aug. 1, 2018

(87) PCT Pub. No.: WO2017/133773
PCT Pub. Date: Aug. 10, 2017

(65) Prior Publication Data
US 2019/0041109 A1    Feb. 7, 2019

(51) Int. Cl.
*F25B 41/06* (2006.01)
*F25B 49/02* (2006.01)

(52) U.S. Cl.
CPC .......... *F25B 41/062* (2013.01); *F25B 49/022* (2013.01); *F25B 2600/2513* (2013.01)

(58) Field of Classification Search
None
See application file for complete search history.

(56) References Cited

U.S. PATENT DOCUMENTS

| 5,396,779 | A | * | 3/1995 | Voss | B60H 1/00792 62/196.2 |
| 6,481,229 | B1 | * | 11/2002 | Yajima | F25B 41/062 236/84 |
| 2008/0216500 | A1 | * | 9/2008 | Chen | F25B 41/062 62/225 |

(Continued)

FOREIGN PATENT DOCUMENTS

| DE | 102012204057 | 9/2013 |
| FR | 2539855 | 7/1984 |
| GB | 1247580 | 9/1971 |

*Primary Examiner* — Henry T Crenshaw
(74) *Attorney, Agent, or Firm* — Volpe and Koenig, P.C.

(57) ABSTRACT

A refrigeration apparatus including a compressor (301), a condenser (302), an expansion device (304), and an evaporator (305), fluidly connected to form a refrigeration cycle for a refrigerant, wherein the compressor (301) has a variable working capacity, and wherein the expansion device (304) has a configurable flow resistance with respect to the refrigerant passing through the expansion device. The apparatus further includes a controller (300) which is configured to determine a current working capacity of the compressor (301) and to control the resistance of the expansion device (304) in dependence on the current working capacity of the compressor (301). The controller (300) is further configured to control the resistance of the expansion device (304) in order to achieve a mass flow of the refrigerant through the expansion device (304), which mass flow corresponds to a mass flow of the refrigerant through the compressor (301).

10 Claims, 5 Drawing Sheets

(56) References Cited

U.S. PATENT DOCUMENTS

| | | | | |
|---|---|---|---|---|
| 2009/0031740 A1* | 2/2009 | Douglas | ............... | F25B 13/00 |
| | | | | 62/225 |
| 2010/0005819 A1* | 1/2010 | Kawakatsu | ........... | F25B 41/062 |
| | | | | 62/225 |
| 2012/0085114 A1* | 4/2012 | Graaf | ............... | B60H 1/00278 |
| | | | | 62/238.7 |
| 2012/0253543 A1* | 10/2012 | Laughman | ............. | F25B 49/02 |
| | | | | 700/300 |
| 2014/0090409 A1* | 4/2014 | Yamashita | ............. | F25B 9/006 |
| | | | | 62/196.1 |
| 2014/0260385 A1* | 9/2014 | Umeda | ............... | F25B 49/02 |
| | | | | 62/180 |
| 2015/0292762 A1* | 10/2015 | Clanin | ............... | F25B 49/02 |
| | | | | 700/276 |
| 2015/0362238 A1* | 12/2015 | Tanaka | ............... | F25B 13/00 |
| | | | | 62/115 |
| 2016/0131384 A1* | 5/2016 | Yoon | ............... | F25B 49/02 |
| | | | | 700/278 |

* cited by examiner

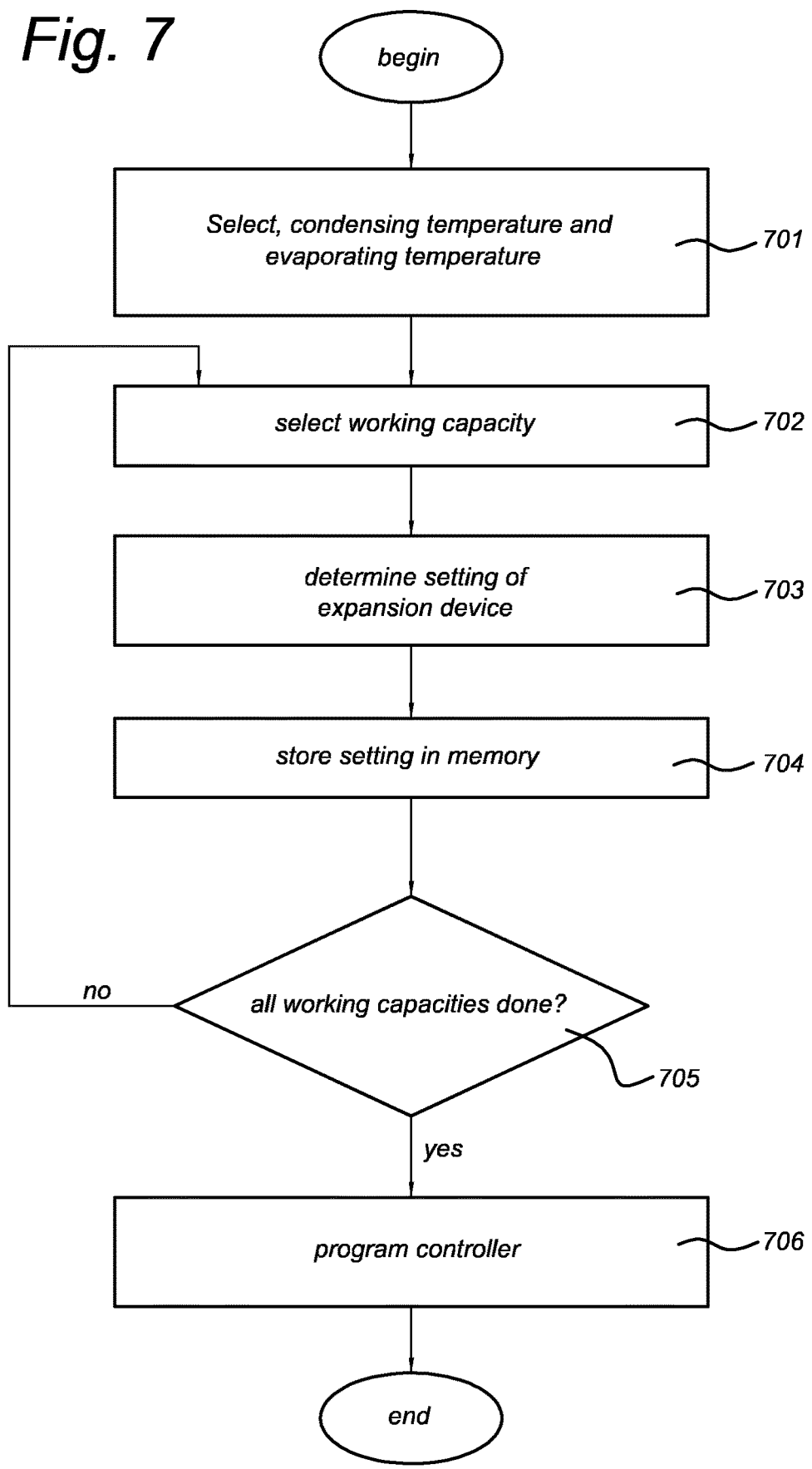

REFRIGERATING APPARATUS

FIELD OF THE INVENTION

The invention relates to a refrigerating apparatus and to methods of operating/making said apparatus.

BACKGROUND OF THE INVENTION

A refrigerating apparatus can be used, e.g., as a fluid cooler to cool a liquid such as water, a consumable liquid such as lemonade or beer, or another fluid. Such fluid coolers are widely employed in industry, household appliances, drinking establishments, restaurants as for example fast food restaurants, catering industry, etc. The fluid refrigerated by the fluid cooler often should be dispensed, for example in a glass. In this kind of industry, it is known to use fluid coolers including a refrigerating vessel comprising a tube containing refrigerant that goes through the inside of the refrigerating vessel. In this way, a cooling liquid, such as water, can be stored inside of the refrigerant vessel; and the refrigerant that flows through the tube, can cool the water. The consumable liquid can be fed through another tube that is immersed in the cooled water. Fluid coolers known in the art comprise a compressor, a condenser, an expansion device, and an evaporator forming a refrigeration cycle. A quantity of refrigerant is disposed inside the fluid cooler. This refrigerant circles through the components of the refrigeration cycle.

GB 1247580 discloses a refrigerating system including a compressor, a condenser, a fluid line, and a cooling unit, wherein the cooling unit comprises an annular refrigerant chamber containing refrigerant.

DE 10 2012 204057 further discloses a heat exchanger comprising a cavity which is filled with refrigerant coming out of an evaporator in order to regulate the temperature of the refrigerant before conveying it to the condenser.

SUMMARY OF THE INVENTION

There is a need for an improved cooling system with enhanced cooling performance.

According to a first aspect of the present disclosure, this object is achieved by the refrigeration apparatus with one or more features of the invention, which refrigeration apparatus is provided for refrigerating a fluid. The apparatus comprises:

a compressor, a condenser, an expansion device, and an evaporator, fluidly connected to form a refrigeration cycle for a refrigerant, wherein the compressor has a variable working capacity, wherein the expansion device has a configurable resistance with respect to the refrigerant passing through the expansion device; and a controller configured to determine a current working capacity of the compressor and to control the resistance of the expansion device in dependence on the working capacity of the compressor.

In this way, the refrigeration apparatus allows to dynamically adapt the expansion device to the working capacity of the compressor. When designing a refrigeration apparatus, the compressor and the expansion device may be designed to obtain certain pressures and temperatures at certain phases of the refrigeration cycle. When the working capacity of the compressor is not fixed but variable, it may be desirable that the expansion device is also variable. For example, the resistance of the expansion device may be adjusted by the controller to be adapted to the current working capacity of the compressor. The variable capacity compressor allows a finer control of the refrigeration cycle by adjusting the capacity of the compressor to the refrigeration demand.

According to a further embodiment, the controller may be configured to control the resistance of the expansion device in order to achieve a mass flow of the refrigerant through the expansion device corresponding to a mass flow of the refrigerant through the compressor. This helps to realize a stable refrigeration cycle for the different working capacities of the compressor.

According to yet another embodiment, the controller may be configured to achieve said mass flow for a predetermined evaporating temperature of the refrigerant and a predetermined condensing temperature of the refrigerant. The temperature of evaporated refrigerant and the temperature of condensed refrigerant can thus be maintained even for different working capacities of the compressor.

In a further embodiment, the controller may comprise a memory in which a plurality of settings of the expansion device are stored, corresponding to a plurality of respective working capacities of the compressor; and the controller may be configured to control the resistance of the expansion device based on the stored settings in the memory. The memory allows the determination of the appropriate setting of the expansion device for each working capacity of the compressor in advance, so that the controller can control the expansion device by looking up the appropriate setting of the expansion device in the memory.

In yet another embodiment, the controller may be configured to determine the current working capacity of the compressor by means of a signal received from the compressor, which signal is indicative of the current working capacity of the compressor. This allows the controller to determine the current working capacity easily.

The apparatus according to the invention may comprise, according to a further embodiment thereof, at least one sensor configured to measure a property of the refrigerant. In this context, the controller may be configured to set the working capacity of the compressor based on the measured property, and to control the compressor to apply the set working capacity. This allows the controller to control not only the resistance of the expansion device, but also the working capacity of the compressor.

According to another embodiment, the expansion device may comprise a valve having different settings corresponding to different (flow) resistances. In this way, the valve can readily apply different resistances according to different settings under control of the controller.

In a particularly advantageous further embodiment, the apparatus may comprise a housing with a valve inlet fluidly connected to a valve outlet, the valve inlet fluidly connected to an outlet of the condenser and the valve outlet fluidly connected to an inlet of the evaporator, a valve member extending into the housing to cause a (flow) resistance in a conduit, which conduit extends from the valve inlet to the valve outlet, in order to regulate a flow of the refrigerant from the valve inlet to the valve outlet, wherein the valve member is configured to move into a specified position in accordance with a signal transmitted by the controller. The resistance can thus be controlled in an easy and reliable fashion by simply moving the valve in an appropriate position, which position is related to a predetermined signal stemming from the controller.

The valve member may be devised as a needle valve member. A needle valve member may be particularly suitable to create an expansion device with a controllable resistance. However, the present invention is not limited to a particular type of valve or valve member.

According to another aspect of the invention, the above-defined object is also achieved by a method of operating a refrigeration apparatus, wherein the refrigeration apparatus comprises a compressor, a condenser, an expansion device, and an evaporator, fluidly connected to form a refrigeration cycle for a refrigerant, wherein the compressor has a variable working capacity, and wherein the expansion device has a configurable resistance with respect to the refrigerant passing through the expansion device, the method comprising:

determining a current working capacity of the compressor; and controlling the resistance of the expansion device in dependence on the current working capacity of the compressor.

According to another aspect of the invention, the above-defined object is also achieved by a method of making a refrigeration apparatus with one or more features of the invention. The method comprises:

providing the apparatus with a compressor, a condenser, an expansion device, and an evaporator, fluidly connected to form a refrigeration cycle for a refrigerant, wherein the compressor has a configurable working capacity, and wherein the expansion device has a configurable resistance with respect to the refrigerant passing through the expansion device;

providing the apparatus with a controller; and configuring the controller to determine a current working capacity of the compressor and to control the resistance of the expansion device in dependence on the current working capacity of the compressor.

The method may further comprise, in an advantageous embodiment thereof, selecting a desired evaporating temperature and a desired condensing temperature; selecting a plurality of different working capacities for the compressor; for each of the selected working capacities: determining a setting of the expansion device that achieves a throughput of refrigerant through the expansion device corresponding to the given or selected working capacity of the condenser at the desired evaporating temperature and the desired condensing temperature, and storing the setting of the expansion device corresponding to the given or selected working capacity of the compressor in a memory of the controller; and programming the controller to determine a current working capacity of the compressor and control the expansion device based on the setting stored for the current working capacity of the compressor. This allows the programming of the controller easily.

In yet another embodiment of the method, the step of determining a setting of the expansion device may comprise operating the compressor at the given or selected working capacity and at the desired evaporating temperature and at the desired condensing temperature; determining a mass flow of refrigerant through the compressor under these operating conditions; and determining the setting of the expansion device based on the determined mass flow. This allows the determination of the setting of the expansion device by experimenting.

The person skilled in the art will understand that the features described above may be combined in any way deemed useful. Moreover, modifications and variations described in respect of the apparatus may likewise be applied to the methods, and modifications and variations described in respect of the methods may likewise be applied to the apparatus.

BRIEF DESCRIPTION OF THE DRAWINGS

In the following, aspects of the invention will be elucidated by means of examples, with reference to the drawings. The drawings are diagrammatic and may not be drawn to scale. Similar items may be denoted by the same reference numerals throughout the figures.

FIG. 7 shows a flowchart illustrating a method of programming a refrigeration apparatus.

DETAILED DESCRIPTION OF THE EMBODIMENTS

In the following, example implementations will be described in more detail with reference to the drawings. However, it will be understood that the details described herein are only provided as examples to aid an understanding of the invention and not to limit the scope of the disclosure. The skilled person will be able to find alternative embodiments which are within the spirit and scope of the present invention as defined by the appended claims and their equivalents.

Figure 1:
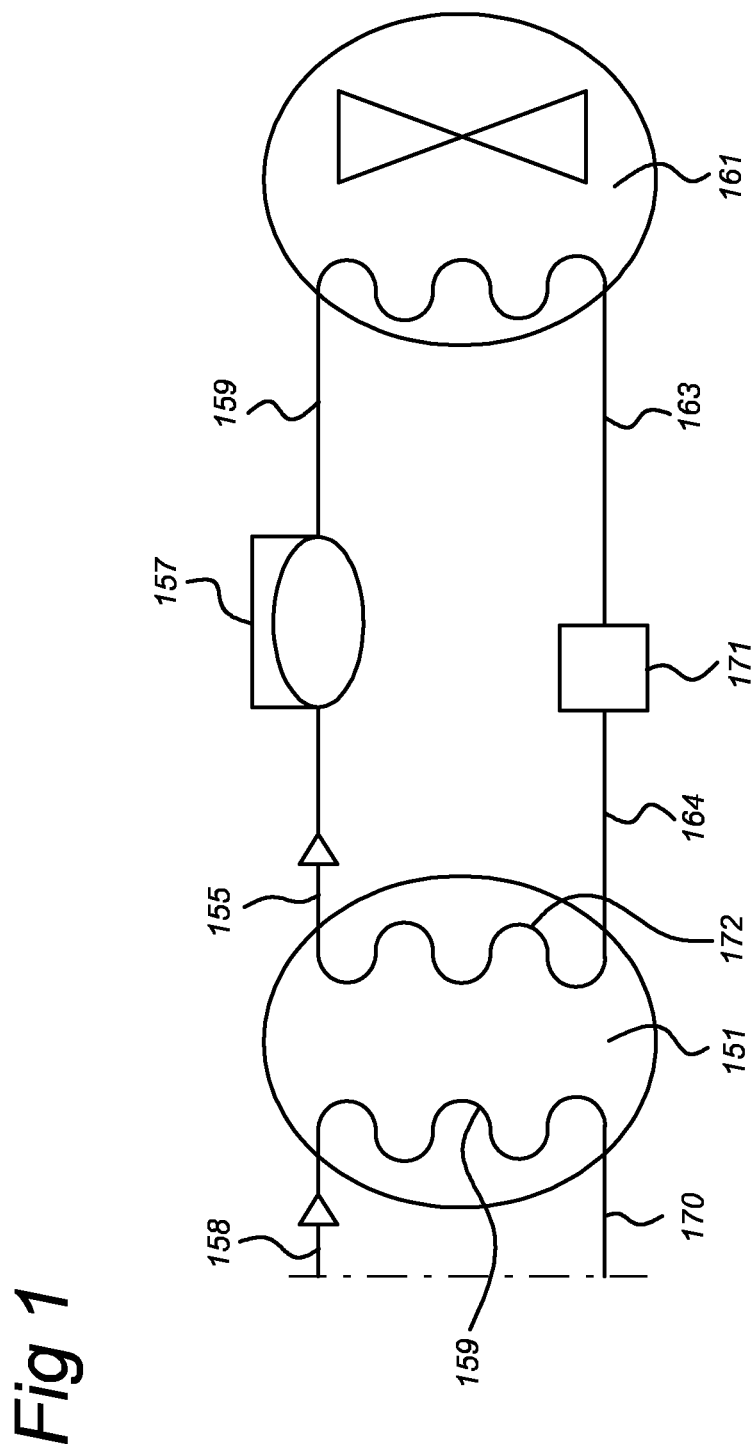
FIG. 1 shows a diagram of a related refrigeration apparatus.

FIG. 1 shows a diagram of a generic cooling system or refrigeration apparatus capable of cooling a fluid. During operation, a refrigerant is circulated through the apparatus in a refrigeration cycle. The refrigerating system of FIG. 1 comprises an evaporator 151, a compressor 157, a condenser 161, and an expansion device 171. The evaporator 151 may be any evaporator known in the art. Likewise, the compressor 157, the condenser 161, and the expansion device 171 may be as known in the art.

The refrigerating system of FIG. 1 may comprise furthermore a fluid input tube 158 and a fluid output tube 170, which may be fluidly connected by a tube 159 inside the evaporator 151. During operation, a fluid to be cooled may be caused to flow through the tube 159 so that the fluid to be cooled exchanges heat with the refrigerant, which may flow through tube 172 of the evaporator. In certain embodiments, both the tube 159 and the tube 172 are immersed in a vessel inside the evaporator 151, which vessel (not shown) comprises a liquid such as water, so that the heat exchange takes place via this liquid. In certain other embodiments, the tube 159 may be replaced by a vessel containing the fluid to be cooled, and the tube 172 is disposed inside this vessel. In certain other embodiments, the tube 172 may be replaced by a vessel containing the refrigerant, and the tube 159 is disposed inside the vessel. Other implementations of the evaporator are also possible, as known in the art per se.

The refrigerating system may further comprise a suction line 155. One of the ends of the suction line 155 may be fluidly connected to tube 172 of the evaporator 151 and arranged to allow the flow of the refrigerant out of the evaporator 151 to the compressor 157. The other end of the suction line 155 may be operatively connected to the compressor 157. The compressor 157 may be arranged to cause a flow of the refrigerant from the evaporator 151 to the compressor 157 through the suction line 155. The compressor 157 may be arranged to compress the refrigerant received from the suction line 155. The refrigerating system may further comprise a discharge line 159 fluidly connecting the compressor 157 to the condenser 161 and arranged to allow a flow of the compressed refrigerant from the compressor 157 to the condenser 161. The condenser 161 may be arranged to condense the compressed refrigerant received from the compressor. The condenser 161 may be any suitable condenser known in the art. In certain embodiments, the evaporator 151 may be arranged to be filled with a liquid to be cooled while a refrigerant may pass through a tube placed inside of the evaporator in such a way that the tube filled with refrigerant traverses the liquid to be cooled thereby refrigerating the liquid.

Figure 2A:
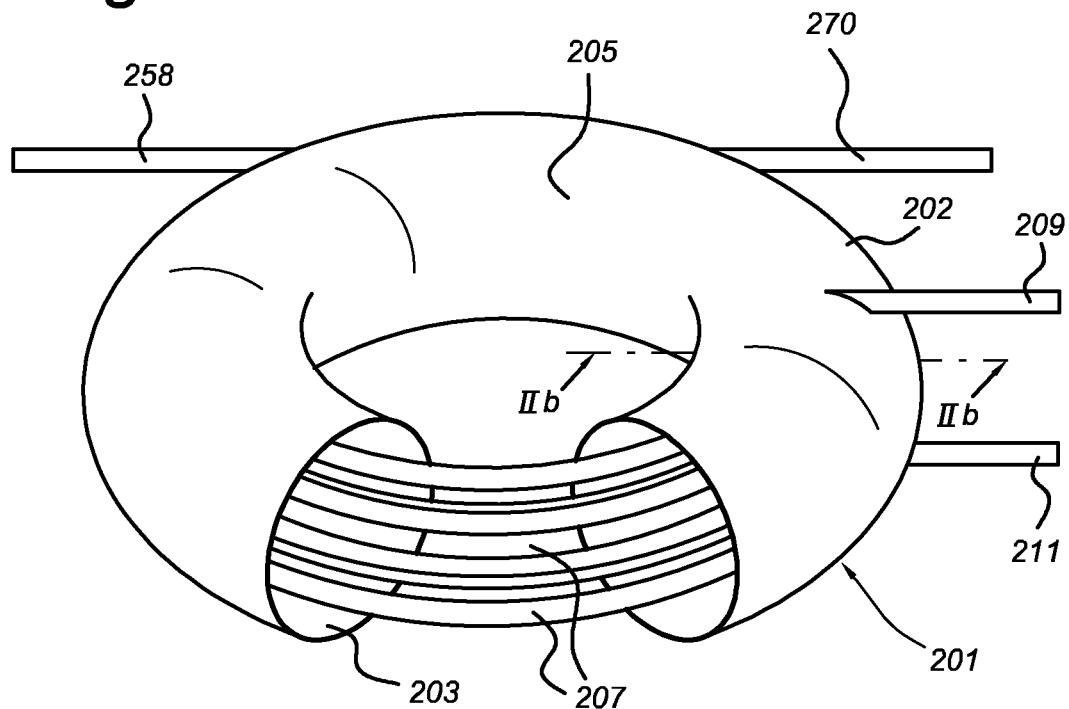
FIG. 2A shows a partly worked open view of a heat exchanger for refrigerating a fluid.

In certain embodiments, the evaporator 151 may be arranged to be filled with refrigerant while a liquid to be cooled may passed through a tube placed inside of the evaporator in such a way that the tube filled with the liquid to be cooled traverses the refrigerant thereby being refrigerated. FIG. 2A illustrates an example of an evaporator working in this way.

FIG. 2A shows a partly worked open view of a heat exchanger for refrigerating a fluid, which can act as the evaporator in a refrigeration cycle. The heat exchanger comprises a vessel 201 for containing the refrigerant. The vessel 201 has a chamber 203 with an inlet 211 and an outlet 209 for transport of the refrigerant into and out of the chamber 203. The tube 207 corresponds to the tube 159 of FIG. 1 and is used to transport the fluid to be cooled through the evaporator. While traveling through the tube 159, the fluid to be cooled exchanges heat with the refrigerant inside the chamber 203 through the wall of the tube 159. A fluid input tube 258 and a fluid output tube 270 for the fluid to be cooled are also shown in the figure. The tube 207 may be arranged in at least one turn around an inner wall 205 of the vessel 201 or the chamber 203. However, the tube 207 may be arranged with a plurality of turns around the inside wall 205, in a coil shape. The plurality of turns may be any suitable number such that the tube is arranged to occupy a predetermined amount of a volume of the inner space 203. However, this is not a limitation. For instance, the tube may be arranged to occupy at least two thirds of the volume of the inner space. Alternatively, the tube may have any size.

In the example shown in FIG. 2A, the vessel has a toroid or 'donut' shape. This allows the filling of the chamber 203 with tubing 207 efficiently without making sharp turns in the tube 207. The suction line 209 connects the chamber to the compressor 157 and the tube 211 fluidly connects the chamber to the expansion device. However, the evaporator is not limited to any particular shape in the context of the present invention.

Figure 2B:
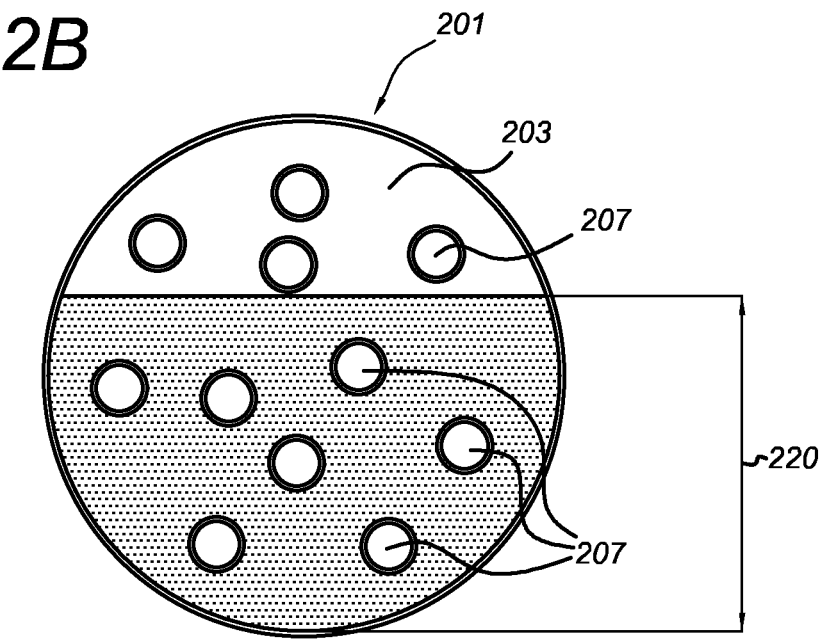
FIG. 2B shows a cross section of the heat exchanger of FIG. 2A.

FIG. 2B shows a cross section in longitudinal direction of a part of the heat exchanger for refrigerating a fluid of FIG. 2A. The tube 207 going through the inner space 203 in several windings around the inner wall 205 is illustrated. The inner space 203 may be filled with liquid refrigerant up to a level illustrated at reference numeral 220 in FIG. 2B. The remainder of the inner space 203 may be filled with gaseous refrigerant, i.e., the refrigerant in its gaseous form. The level 220 of the liquid refrigerant may be chosen according to the application needs. Also, during use, the level changes or can become indefinite due to gas formation.

Referring again to FIG. 1, in the design of a refrigeration apparatus, the components of the refrigeration cycle may be tuned to one another and the components may be configured to cooperate with each other to achieve certain refrigeration capabilities and properties of the refrigerant in the different stages of the refrigeration cycle. For example, first an evaporating temperature and a condensing temperature may be chosen as design parameters of the refrigeration apparatus. For example, the evaporating temperature may refer to the temperature of the refrigerant in the evaporator 151. Since the substance to be cooled exchanges heat with the refrigerant in the evaporator 151, this evaporating temperature may influence the output temperature of a fluid to be cooled. The condensing temperature may refer to the temperature of the refrigerant in the condenser 161. Also, the capacity of the compressor 157 under this evaporating temperature and condensing temperature is determined. This capacity may be expressed, for example, in volume displacement per time unit.

Based on the predetermined evaporating temperature, the predetermined condensing temperature, and the capacity of the compressor in terms of volume flow, the mass flow of the refrigerant through the compressor 157 can be determined. Based on this mass flow, it is determined what the throughput capacity of the expansion device 171 should be in order to let the apparatus operate at the predetermined evaporating temperature and condensing temperature. This throughput capacity corresponds to a particular resistance (flow resistance) of the expansion device 171. The throughput capacity of the expansion device 171 may be determined or calculated based on a thermodynamic analysis of the refrigeration cycle. Alternatively or additionally, the appropriate expansion device setting may be found by trial and error.

In case of a compressor 157 with a configurable working capacity and an expansion device 171 with a configurable resistance, the above procedure can be repeated for several different values of the working capacity of the compressor 157. For each different value of the working capacity of the compressor 157, a corresponding setting of the expansion device 171 can be determined. These values can be stored as a table in a memory, so that the setting of the expansion device 171 can be looked up for any setting of the compressor 157. For example, a controller can be provided that receives the setting of the compressor 157, looks up the corresponding setting of the expansion device 171, and sends a related control signal to control the expansion device 171 according to the looked up setting. Also, if the current working capacity of the compressor 157 is not present in the table, the controller may be configured to determine the setting of the expansion device 171 by interpolating the data that is available in the table.

For example, the settings are determined and stored for a maximum working capacity of the compressor 157, the minimal working capacity of the compressor 157, and an optional number of intermediate working capacities in between the minimal working capacity and the maximum working capacity of the compressor 157. For example, ten intermediate positions can be determined at regular intervals. However, any suitable number of positions and/or any interval size can be used. Instead of such pre-determined settings, it is possible to implement a computational model in which the setting of the expansion device is computed based on the working capacity of the compressor by using an appropriate mathematical formula.

It is noted that it is possible to take into account the efficiency of the compressor 157 to determine the working capacity of the compressor 157. This efficiency can be determined experimentally or from a know specification of the compressor 157.

Suitable refrigerants for use in the present context include propane based refrigerant and Freon based refrigerant. An example of Freon is chlorodifluoromethane or difluoromonochloromethane. However, other kinds of refrigerant may be used instead.

A detailed example is provided in the following. The numeric values in the example are merely illustrative, and may be replaced according to the application at hand. In the example, propane is used as a refrigerant, for example R290. However, other refrigerants may be used instead. The evaporating temperature may be selected to be, for example, −2 degrees Celsius, and the condensing temperature may be selected to be, for example, +30 degrees Celsius. The displacement of the compressor 157 per revolution of a fan comprised therein may be a known specification of the compressor (e.g., 18 cubic centimeters per revolution), and the fan can be controlled to rotate at different speeds in a specified range, for example from 18 to 120 revolutions per second. By multiplying the displacement per revolution with the number of revolutions per second, the volume displacement per second may be computed. Based on the temperature, the mass density of the refrigerant can be determined, using a thermodynamic table. Using the mass density and the volume displacement per second, the mass displacement per second may be computed.

The dimensions and properties of the condenser 161 may be selected based on, among others, the working temperatures of the refrigerant in certain phases of the refrigeration cycle, the displacement caused by the compressor 157, the amount of heat that needs to be extracted from the fluid to be cooled, etc. Use may be made of a Mollier diagram to design the components of the refrigeration apparatus, in a way known in the art per se.

The expansion device 171 may have a controllable resistance, so that the throughput of refrigerant through the expansion device 171 can be regulated. The throughput of the expansion device 171 may be controlled to be about the same as the displacement by the compressor 157, in terms of mass flow. The condensing temperature and the evaporating temperature may be taken into account to select the expansion device flow resistance, since the mass flow through the expansion device 171 depends on these factors.

It is noted that the above mentioned computations may also be based on condensing pressure and evaporating pressure, instead of or in addition to condensing temperature and evaporating temperature. Since the total mass of refrigerant in the refrigeration cycle is fixed, the temperature and the pressure are closely related, according to the laws of thermodynamics.

Figure 3:
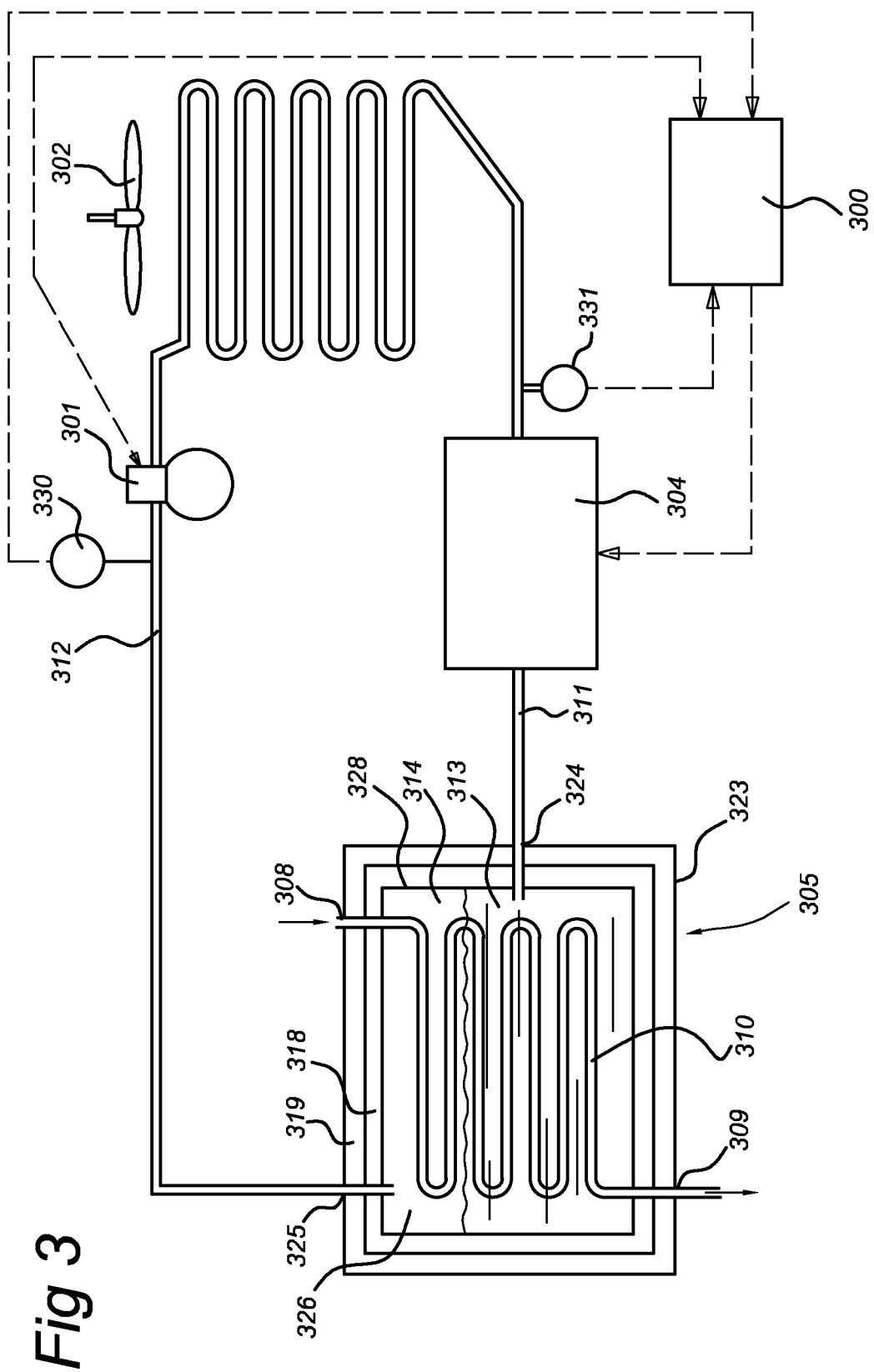
FIG. 3 shows a first embodiment of a refrigeration apparatus.

FIG. 3 shows a more detailed diagram of a refrigeration apparatus capable of circulating refrigerant in a refrigeration cycle. Said diagram is used to further explain features of the present invention some of which have already been described in view of FIG. 1. The cooling system devised by said apparatus comprises a compressor 301, a condenser 302, an expansion device 304, and an evaporator 305. These components 301, 302, 304, 305 are fluidly connected to form the refrigeration cycle. Many different implementations of the compressor, condenser, valve, expansion device, and evaporator are known in the art.

In the following, the evaporator 305 will be described in greater detail. It will be noted that in FIG. 3, the compressor 301, condenser 302, and expansion device 304 are drawn as symbols to indicate that any suitable device can be used. However, the evaporator 305 has been drawn in greater detail to illustrate certain aspects thereof. Nevertheless, it will be understood that the illustrated evaporator 305 is only an example and may be replaced by another suitable type of evaporator, such as one of the other types of evaporators disclosed herein.

The evaporator 305 shown in FIG. 3 has a vessel 323 with an inner space 326 bounded by an inner surface 328 of a vessel wall 318. In the exemplary embodiment, an optional isolating layer 319 covers the vessel wall 318 to provide thermal insulation. The vessel 323 comprises an inlet 324 to transport refrigerant into the inner space 326 and an outlet 325 to transport refrigerant out of the inner space 326. To provide the function of an evaporator, the refrigerant is kept under pressure in the inner space 326 and is partially in liquid phase 313 and partially in gaseous phase 314. A tube portion 310 is disposed inside the inner space 326. The outside surface of the tube portion 310 may be in direct contact with the refrigerant 313, 314 to allow efficient heat exchange. A first end 308 of the tube portion 310 is fixed to a first orifice of the vessel 323 and a second end 309 of the tube portion 310 is fixed to a second orifice of the vessel 323 to enable fluid communication into and/or out of the tube portion 310 through the first orifice and the second orifice. More such tube portions and orifices may be provided, for example to allow a plurality of fluids to be cooled in separate tubes. A part of the tube portion 310 is shown to be immersed in the liquid refrigerant 313. Also, a part of the tube is shown to be above the level of liquid refrigerant, surrounded by gaseous refrigerant 314. In use, the liquid refrigerant 313 evaporates due to heat exchange between the refrigerant 313 and the fluid inside the tube portion 310.

The vessel 323 shown in FIG. 3 does not have a toroid shape (cf. FIG. 2A) but a rectangular shape. The tube 310 makes several turns inside the chamber 326. Otherwise, the evaporator may function similar to the evaporator shown in FIGS. 2A and 2B. The orifices may enclose the tube ends 308, 309 such that no refrigerant can enter or leave the inner space through the orifice, and no other fluids from the exterior of the vessel 323 may enter through the orifice into the inner space 326. However, fluid exchange into and out of the tube portion 310 is made possible. Further, the inlet 324 and outlet 325 of the vessel 323 are connected to tubing 311, 312 to transport the refrigerant from the expansion device 304 into the inner space 326 and from the inner space 326 to the compressor 301. The inlet 324 as shown is located below the level of liquid refrigerant. However, the inlet 324 may also be located above the level of liquid refrigerant in other embodiments. The outlet 325 may be located at the top side of the inner space 326, or at least above a level of liquid refrigerant inside the inner space. This way, liquid refrigerant may be prevented from reaching the compressor 301. However, the outlet may also be located below the level of liquid refrigerant in alternative implementations. It will be noted that when in use, the level of liquid refrigerant may vary and the liquid refrigerant may spread throughout the vessel 323 while bubbles of gaseous refrigerant move upwardly.

As mentioned above, the evaporator 305 may be replaced by any other type of evaporator. In the following, it is described how the flow of refrigerant through the refrigeration cycle may be controlled by means of a controllable expansion device 304. This concept may also be applied to a refrigeration apparatus having another kind of evaporator. In the configuration shown in FIG. 3, the expansion device 304 is positioned between the condenser 302 and the evaporator 305.

Also, a sensor 330 may be optionally provided at the inlet of the compressor 301 to measure a property of the refrigerant that enters the compressor 301. A second sensor 331 may be optionally provided at an inlet of the expansion device 304 to measure the same property or another property of the refrigerant that enters the expansion device 304. The measured property may be temperature or pressure, for example. The location of the sensors 330, 331 can be chosen differently than depicted in FIG. 3. For example, one sensor may be configured to measure the property in the low-pressure portion of the refrigeration cycle (from the outlet of the expansion device 304 to the inlet of the compressor 301), and the other sensor may be configured to measure the property in the high-pressure portion of the refrigeration cycle (from the outlet of the compressor 301 to the inlet of the expansion device 304).

The controller 300 may be configured to receive information (in the form of a suitable signal) from sensor 330 and/or sensor 331, preferably by a wired or wireless connection, and use said information to control the components of the refrigeration apparatus including the compressor 301 and/or the expansion device 304. The controller 300 may optionally be configured to control the working capacity of the compressor 301. The working capacity may be controlled for example based on a temperature or pressure measured by the sensor 330. If the measured temperature increases, the compressor 301 may be controlled to increase its working capacity, because an increasing temperature may be an indication that more heat needs to be extracted from the fluid to be cooled in the tube 310. In an alternative configuration, the compressor 301 may operate independently from the controller 300, for example using its own thermometer, and only send status information about its current working capacity to the controller 300.

Thus, the controller 300 has information about the current operating capacity of the compressor 301, and controls the expansion device 304 so that the expansion device 304 has a throughput that corresponds to the throughput of the compressor 301 in terms of mass flow.

The controller 300 may comprise, for example, a suitable microcontroller or processor (not shown) and a memory (not shown) for storing a software program with instructions that the microcontroller or processor is configured to execute. Alternative implementations of controller 300 are also possible, for example by means of an FPGA or a dedicated electronic circuit.

An example of a pressure sensor that may be used as one of the sensors 330, 331 is a pressure transmitter (PT) that converts a pressure into a linear electrical output signal. An example implementation of a pressure transmitter may comprise a piezo resistive chip enclosed in an oil capsule. An example of a temperature sensor is a negative temperature coefficient (NTC) thermistor. These examples of pressure sensors and temperature sensors are known in the art per se. Other types of pressure sensors and temperature sensors can also be used in the different implementations disclosed herein.

The sensor 330 and sensor 331 may be connected to the controller 300 such that the controller 300 may regularly receive measured data from these sensors, in wired or in wireless fashion.

Also, the controller 300 may calculate the mass flow of refrigerant going through the expansion device 304 based on the pressure of the refrigerant on both sides of the expansion device 304 and the properties and current setting of the expansion device 304. Additional sensors may be required in this context. For example, the volume of refrigerant that flows through the expansion device 304 per time unit may be looked up in a look-up table comprised in the controllers memory, which table maps pressure difference to volume per time unit, given the setting of the expansion device. The controller 300 may dynamically adjust the setting of the expansion device 304 based on the measurements of the sensors 330, 331.

The mass density of the refrigerant may be determined from a thermodynamic look-up table based on the pressure or the temperature. The thermodynamic table provides the relationship between, among others, temperature, pressure, and mass density of the refrigerant in saturated condition. Since the thermodynamic table allows to determine the pressure from a measured temperature, and to determine the temperature from a measured pressure, the sensors used may be temperature sensors or pressure sensors. By using both temperature and pressure sensors, the accuracy may be improved and/or special circumstances, such as leakage or superheating, may be detected by the controller 300.

The controller 300 may calculate or look up the working capacity of the compressor 301 based on the electrical current that the compressor 301 is consuming (for instance with a transformer). The consumed current is a good indication of the working capacity of the compressor. Electrical current values may be mapped to working capacity values by means of a suitable look-up table.

Figure 4:
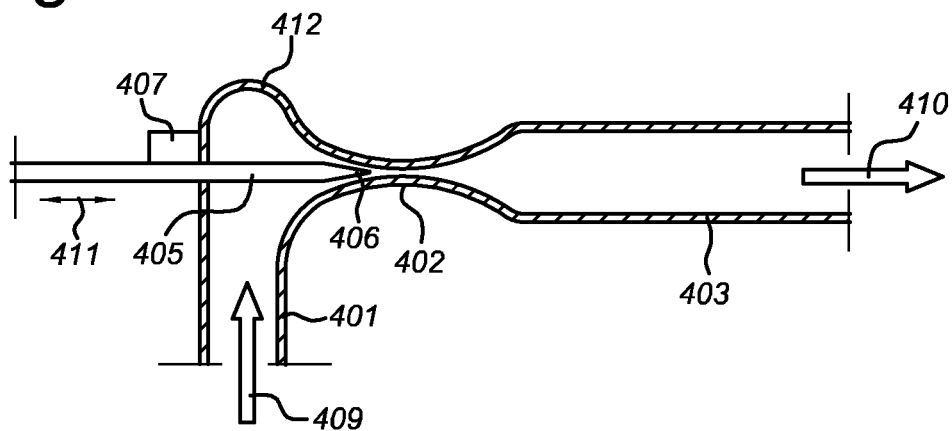
FIG. 4 shows an example of an expansion device with a variable resistance.

FIG. 4 illustrates an illustrative example implementation of the expansion device 304 comprised in FIG. 3. However, it will be understood that alternative embodiments of the expansion device are within reach of the skilled person. The expansion device has a controllable flow resistance or throughput. The expansion device has a housing 412 with an inlet 409 and an outlet 410. The inlet 409 of the expansion device may be fluidly connected to the outlet of the condenser 302 (cf. FIG. 3) via tube 401 as shown in FIG. 4, and the outlet 410 of the expansion device may be fluidly connected to the inlet 324 of the evaporator 305 (cf. FIG. 3) via tube 403 as shown in FIG. 4. The expansion device has a narrow passage or conduit 402 that interconnects inlet 409 and outlet 410, through which passage the refrigerant has to pass in order to flow from the condenser 302 to the evaporator 305 (cf. FIG. 3). The expansion device has a pin 405 or needle with a tapered end 406, wherein the tapered end 406 points towards the narrow passage 402. The pin 405 is movable in its longitudinal direction as indicated by arrows 411. The closer the tapered end 406 of the pin 405 is to the narrow passage 402, the larger the resistance of the expansion device and the smaller the throughput of refrigerant through the expansion device. The expansion device comprises an actuator 407 which can control the longitudinal position of the pin 405 with respect to the narrow passage 402. An implementation of actuator 407 could comprise a toothed wheel that engages teeth provided on the pin 405. The actuator 407 may further comprise an electromotor to rotate the toothed wheel under control of an input signal. The controller 300 (cf. FIG. 3) may be operatively connected to the actuator 407 to control the electromotor. Many other implementations of the actuator 407 are possible.

Referring to both FIG. 3 and FIG. 4, in an exemplary implementation of the refrigerating apparatus, the controller 300 may map the working capacity of the compressor 301 to a position of the pin 405. Based on the current working capacity of the compressor 301, the controller 300 may control the actuator 407 so that the actuator 407 moves the pin 405 to the position corresponding to the current working capacity of the compressor.

Although an illustrative example of the expansion device 304 has been described hereinabove with reference to FIG. 4, the expansion device may be replaced by another suitable type of expansion device. In certain embodiments, the expansion device 304 may comprise a pulsating membrane. The pulsations of the membrane may be controlled by the controller 300 to regulate the resistance of the expansion device 304. For example, a solenoid valve may be used as the pulsating membrane. Such a solenoid valve may be powered by a direct current power supply. By opening and closing the valve in a pulsating fashion, a quantity of liquid refrigerant may pass through the pulsating membrane. The quantity of refrigerant that passes through the pulsating membrane depends on the pressure difference between the high-pressure side of the pulsating membrane and the low-pressure side of the pulsating membrane, and the time duration in which the membrane is closed and the time duration in which the membrane is opened in each pulse. The pulsating behaviour may be controlled by the controller 300.

In certain embodiments, the expansion device 304 may comprise a motor controlled ball valve.

In certain embodiments, the expansion device 304 may comprise a number of gears, which inject the liquid refrigerant into the direction of the evaporator 305. At least one of the gears is driven by an electromotor. The speed of the electromotor is controlled by the controller 300. Such an injection organ may operate on the basis of volume flow. By increasing the number of revolutions per second of the gears, the volume of the refrigerant that is transported from the high-pressure part of the refrigeration cycle towards the low-pressure part per time unit increases. By decreasing the number of revolutions per second of the gears, the volume of the refrigerant that is transported from the high-pressure part of the refrigeration cycle towards the low-pressure part per time unit decreases.

Figure 5:
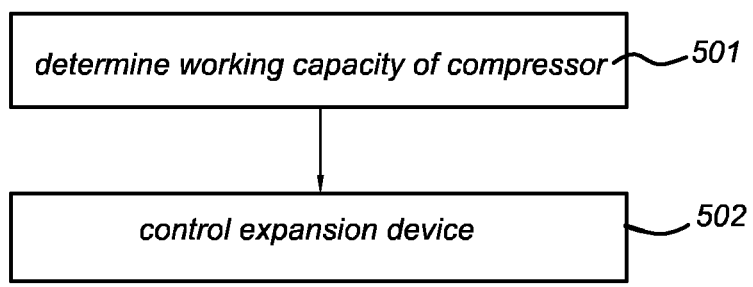
FIG. 5 shows a flowchart of a method of operating a refrigeration apparatus.

FIG. 5 illustrates a method of operating a refrigeration apparatus set forth herein. The method may be performed, for example, by a computer, or by the controller 300 of the refrigeration apparatus. In step 501, a current working capacity of the compressor is determined. In step 502, the resistance of the expansion device is controlled in dependence on the working capacity of the compressor 502, as set forth hereinabove.

Figure 6:
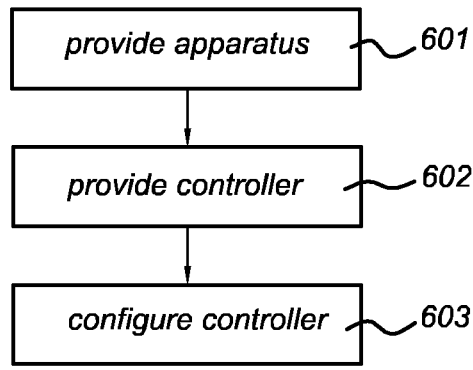
FIG. 6 shows a flowchart of a method of making a refrigeration apparatus.

FIG. 6 illustrates a method of making a refrigeration apparatus. In step 601, the apparatus is provided with or constituted from a compressor 301, a condenser 302, an expansion device 304, and an evaporator 305, fluidly connected to form a refrigeration cycle for a refrigerant, as illustrated in FIG. 3. The compressor has a configurable working capacity, and the expansion device 304 has a configurable resistance with respect to the flow of refrigerant passing through the expansion device 304. In step 602, the apparatus is provided with a controller 300. In step 603, the controller 300 is configured to determine a working capacity of the compressor 301, and to control the resistance of the expansion device 304 in dependence on the working capacity of the compressor 301.

FIG. 7 illustrates an example of step 603 of FIG. 6 in greater detail. In step 701, a desired evaporating temperature and a desired condensing temperature are selected. In step 702, one of a plurality of predetermined working capacities of the compressor is selected. In step 703, a setting of the expansion device that achieves a throughput of refrigerant through the expansion device corresponding to the given working capacity of the condenser at the desired evaporating temperature and the desired condensing temperature is determined. In step 704, the setting is stored in the memory of the controller. In step 705, it is checked whether all predetermined working capacities have been dealt with. If not, the process continues from step 702 with the next working capacity. If yes, in step 706, the controller is programmed so that it will, during operation, determine a current working capacity of the compressor and control the expansion device based on the setting stored for the current working capacity of the compressor. This programming step 706 may be performed independently of the other steps. For example, the programming step 706 could involve loading a program into the memory of the controller. This program can be loaded into the memory before or after the settings are stored in the memory.

In a particular example, step 703 comprises operating the compressor at the given or selected working capacity and at the desired evaporating temperature and at the desired condensing temperature, determining a mass flow of refrigerant through the compressor under these operating conditions, and determining the setting of the expansion device based on the determined mass flow.

The examples and embodiments described herein serve to illustrate rather than limit the invention. The person skilled in the art will be able to design alternative embodiments without departing from the scope of the claims. Reference signs placed in parentheses in the claims shall not be interpreted to limit the scope of the claims. Items described as separate entities in the claims or the description may be implemented as a single hardware or software item combining the features of the items described.

The invention claimed is:

1. A refrigeration apparatus, comprising:
   a compressor (301), a condenser (302), an expansion device (304), and an evaporator (305), fluidly connected to form a refrigeration cycle for a refrigerant, the compressor (301) has a variable working capacity, and the expansion device (304) has a configurable resistance with respect to the refrigerant passing through the expansion device; and
   a controller (300) configured to determine a current working capacity of the compressor (301) and to control the resistance of the expansion device (304) in dependence on the working capacity of the compressor (301);
   a non-volatile memory of the controller configured with a plurality of different working capacities for the compressor, and for each of the selected working capacities, an associated setting of the expansion device is stored that achieves a throughput of the refrigerant through the expansion device corresponding to the selected working capacity of the compressor at a desired evaporating temperature of the refrigerant and a desired condensing temperature;
   wherein the controller is further configured to control the resistance of the expansion device in dependence on the setting stored for the current working capacity of the compressor.

2. The apparatus of claim 1, wherein the controller (300) is configured to control the resistance of the expansion device (304) in order to achieve a mass flow of the refrigerant through the expansion device (304) corresponding to a mass flow of the refrigerant through the compressor (301).

3. The apparatus of claim 1, wherein the controller (300) is configured to determine the current working capacity of the compressor (301) based on a signal received from the compressor (301), and said signal is indicative of the current working capacity of the compressor (301).

4. The apparatus of claim 1,
further comprising at least one sensor (330) configured to measure a property of the refrigerant; and
the controller (300) is configured to set the working capacity of the compressor (301) based on the measured property of the refrigerant, and to control the compressor (301) to apply the set working capacity.

5. The apparatus of claim 1, wherein the expansion device (304) comprises a valve having different settings corresponding to different resistances.

6. The apparatus of claim 5, wherein the valve comprises a housing (412) with a valve inlet (409) fluidly connected to a valve outlet (410), the valve inlet (409) fluidly connected to an outlet of the condenser (302) and the valve outlet (410) fluidly connected to an inlet (324) of the evaporator (305),
a valve member (405) extending into the housing (412) to cause a flow resistance in a conduit (402) that extends from the valve inlet (409) to the valve outlet (410), to regulate a flow of the refrigerant from the valve inlet (409) to the valve outlet (410), and the valve member (405) is configured to move into a specified position in accordance with a signal transmitted by the controller (300).

7. The apparatus of claim 6, wherein the valve member (405) is a needle valve member.

8. A method of operating a refrigeration apparatus, the refrigeration apparatus comprising a compressor, a condenser, an expansion device, and an evaporator, fluidly connected to form a refrigeration cycle for a refrigerant, the compressor has a variable working capacity, and the expansion device has a configurable resistance with respect to the refrigerant passing through the expansion device,
the method comprising:
selecting a desired evaporating temperature and a desired condensing temperature;
selecting a plurality of different working capacities for the compressor;
for each of the selected working capacities:
determining a setting of the expansion device that achieves a throughput of the refrigerant through the expansion device corresponding to the selected working capacity of the compressor at the desired evaporating temperature and the desired condensing temperature, and
storing the setting of the expansion device corresponding to the selected working capacity of the compressor in a memory of the controller;
determining a current working capacity of the compressor (501); and
controlling the resistance of the expansion device in dependence on the setting stored for the current working capacity of the compressor (502).

9. A method of making a refrigeration apparatus, comprising:
providing the refrigeration apparatus with a compressor, a condenser, an expansion device, and an evaporator, fluidly connected to form a refrigeration cycle for a refrigerant, the compressor has a variable working capacity, and the expansion device has a configurable resistance with respect to the refrigerant passing through the expansion device (601);
providing the refrigeration apparatus with a controller (602);
configuring the controller to determine a current working capacity of the compressor and to control the resistance of the expansion device in dependence on the current working capacity of the compressor (603);
selecting a desired evaporating temperature and a desired condensing temperature (701);
selecting a plurality of different working capacities for the compressor;
for each of the selected working capacities:
determining a setting of the expansion device that achieves a throughput of the refrigerant through the expansion device corresponding to the selected working capacity of the compressor at the desired evaporating temperature and the desired condensing temperature (703), and
storing the setting of the expansion device corresponding to the selected working capacity of the compressor in a memory of the controller (704); and
programming the controller to determine a current working capacity of the compressor and control the expansion device based on the setting stored for the current working capacity of the compressor (706).

10. The method of claim 9, wherein the step of determining a setting of the expansion device (703) comprises:
operating the compressor at the selected working capacity and at the desired evaporating temperature and at the desired condensing temperature;
determining a mass flow of refrigerant through the compressor under these operating conditions; and
determining a setting of the expansion device based on the determined mass flow.

* * * * *